US010350489B2

United States Patent
Chao

(10) Patent No.: US 10,350,489 B2
(45) Date of Patent: Jul. 16, 2019

(54) GAMING CONTROLLER BUTTON PERFORMANCE

(71) Applicant: Nvidia Corporation, Santa Clara, CA (US)

(72) Inventor: Ron Chao, San Diego, CA (US)

(73) Assignee: Nvidia Corporation, Santa Clara, CA (US)

( * ) Notice: Subject to any disclaimer, the term of this patent is extended or adjusted under 35 U.S.C. 154(b) by 557 days.

(21) Appl. No.: 15/058,852

(22) Filed: Mar. 2, 2016

(65) Prior Publication Data

US 2017/0252644 A1 Sep. 7, 2017

(51) Int. Cl.
  *A63F 9/24* (2006.01)
  *A63F 13/24* (2014.01)
  *A63F 13/218* (2014.01)

(52) U.S. Cl.
  CPC ............ *A63F 13/24* (2014.09); *A63F 13/218* (2014.09)

(58) Field of Classification Search
  CPC ....... A63F 13/24; A63F 13/218; H01H 21/00; H01H 13/00
  See application file for complete search history.

(56) References Cited

U.S. PATENT DOCUMENTS

| | | | | |
|---|---|---|---|---|
| 4,786,766 A * | 11/1988 | Kobayashi | ........... | H01H 13/705 200/5 A |
| 8,912,458 B2 * | 12/2014 | Peterson | ............... | G06F 3/0202 200/344 |
| 9,213,372 B2 * | 12/2015 | Krumpelman | ......... | H01H 13/14 |
| 9,972,462 B1 * | 5/2018 | Chen | ...................... | H01H 13/52 |
| 2001/0023203 A1 * | 9/2001 | Chiu-Hao | ............... | A63F 13/06 463/37 |
| 2002/0167787 A1 * | 11/2002 | Kitamura | ........... | H01H 13/7006 361/625 |
| 2006/0137966 A1 * | 6/2006 | Kato | .................... | H01H 13/705 200/512 |
| 2007/0051607 A1 * | 3/2007 | Scigiel | ................... | H01H 13/14 200/341 |
| 2010/0308664 A1 * | 12/2010 | Face | ................... | H02J 13/0075 307/104 |

OTHER PUBLICATIONS

Dual Shock 4. psdevwiki.com. Online. Mar. 15, 2015. Accessed via the Internet. Accessed Jun. 21, 2018. <URL: https://web.archive.org/web/20150315152822/http://www.psdevwiki.com/ps4/DualShock_4>.*

* cited by examiner

*Primary Examiner* — Dmitry Suhol
*Assistant Examiner* — Carl V Larsen

(57) ABSTRACT

Aspects of the present invention are directed to techniques for improving the manufacturing control mechanisms—specifically game controllers—for computerized electronic devices. According to one aspect of the present invention, a button assembly is provided that eliminates the need for dampers or gaskets for shock absorption by implementing the hammer and pad using novel and advantageous geometries. According to one embodiment, the bottom or striking surface of the hammer in a button assembly is implemented at an angle, which, when pressed, strikes a similarly angled surface of the landing pad. The slope of the corresponding angles cause the hammer to slide along the angled surface, and for the kinetic force of the impact to be redirected as shearing force away from the button assembly (and the corresponding user appendage).

22 Claims, 7 Drawing Sheets

GAMING CONTROLLER BUTTON PERFORMANCE

FIELD OF THE INVENTION

This present invention refers generally to techniques for improving the manufacture and performance of user input control mechanisms. More specifically, the invention is directed to a solution for reduced parts and labor costs in manufacturing gaming controllers while increasing user comfort levels and improving overall user experience.

BACKGROUND OF THE INVENTION

The progress of computerized electronics has led to a recent surge in the integration of processing and networking capabilities in many tools and household appliances. Naturally, the interaction between human users and these devices presents one of the most important aspects of any consumer electronic device's design, and providing user interfaces that enable a user to quickly, effectively, and comfortably control an electronic device is a core objective for every hardware designer.

Video electronic gaming is among the most popular sources of interactions between humans and computerized devices. Recently, competitive gaming, sometimes referred to as "e(lectronic)-sports" has experienced a rapid growth in popularity and exposure. Like many other competitions, success at high levels of competitive gaming requires a substantial commitment of time towards training and practice for most of the competitors. Even recreational game players may spend extended periods of time gaming. Various implementations have been developed for control mechanisms to increase the effectiveness or otherwise improve the user experience and immersiveness of video gaming.

Control mechanisms can range from all-purpose user interface platforms such as keyboards and mouse pointers, to highly specific assemblies that emulate an automobile driver's seat or pilot's cockpit. A game pad—a hand held controller typically gripped with two hands and features at least one set of omni-directional digital buttons and a plurality of other buttons which may be digital or analog—has become the universal standard for dedicated gaming controllers, although the size and shape of game pads may vary depending on the manufacturer and corresponding game console.

Conventional game pads also feature one or more (typically paired) sets of buttons designed to be larger and more responsive, and generally used to simulate a trigger and to receive short, quick motions from a user. Since these trigger buttons are often the most frequently and rapidly used control mechanisms on a game pad, many hardware manufacturers have started to include additional features to lessen the physical stress of the impact from repeatedly pressing trigger buttons, and to increase overall user comfort and the user experience. These comfort-increasing features may include, for example, trigger buttons with ergonomically designed curves, softer materials, and/or more natural positions.

Another feature that has been introduced is the use of dampers to absorb the shock from the impact of a button press. FIG. 1 depicts a conventional trigger or bumper button assembly 100 that is implemented with a hammer 101 that is depressed via user motion, and a counter weight or level that repositions the hammer to its original position when the button is not being pressed. The hammer generally travels in a short arc until it strikes a landing pad 103, whereupon an actuation of the button is registered by the controller, either through a sensor in the pad, or more commonly, through a rotation of a gear 113 connected to the hammer via a bar 111 that extends and retracts as the hammer is pressed and released, respectively. A second damper 107 is often placed in a position to stop the hammer via a protruding fin 109 and absorb the impact as it returns to its natural, un-actuated position.

These dampers are typically made from silicone or other softer (relative to the casing of the controller or of the button itself) material. Gaskets may also be used instead of dampers. In either case, installing the dampers or gaskets within the tight confines of game controller shell casings has yet to be automated, and must be performed by hand. Accordingly, accounting for controller manufacturing costs must not only include the cost of producing both the dampers (or gaskets), but the labor time and cost required to assemble the controller to install the damper or gasket arrangements as well. For large productions, these costs can be substantial.

SUMMARY OF THE INVENTION

This Summary is provided to introduce a selection of concepts in a simplified form that are further described below in the Detailed Description. This Summary is not intended to identify key features or essential features of the invention, nor is it intended to be used to limit the scope of the invention.

Aspects of the present invention are directed to techniques for improving the manufacturing control mechanisms—specifically game controllers—for computerized electronic devices. According to one aspect of the present invention, a button assembly is provided that eliminates the need for dampers or gaskets for shock absorption by implementing the hammer and pad using novel and advantageous geometries. According to one embodiment, the bottom or striking surface of the hammer in a button assembly is implemented at an angle, which, when pressed, strikes a similarly angled surface of the landing pad. The slope of the corresponding angles cause the hammer to slide along the angled surface, and for the kinetic force of the impact to be redirected as shearing force away from the button assembly (and the corresponding user appendage).

According to another aspect of the present invention, a method is provided that registers actuations of a button assembly with new and advantageous geometries, wherein a user motion that is received on the button depresses a hammer which strikes a landing pad. The novel geometries of the striking and receiving surfaces allows the hammer to slide slightly along the downward slope of the similarly angled receiving surface, thereby dissipating the reactionary force of the impact by redirecting the force to a shearing force along the edges. Actuation of the user motion (button press) is registered by either a sensor in the landing pad or via a bar that rotates a gear or piston assembly with a sensor.

According to the various aspects described above, the absorption capabilities may be increased by including a flexible joint that connects to the hammer in the button assembly that allows the hammer to slide when the button is pressed and relaxes back to its normal position when the button assembly is released. Still further embodiments provide a cavity in the hammer and/or the pad that decreases the rigidity of the respective structures and provides greater shock absorption capabilities. These cavities may be implemented as both angular and rounded cavities as necessary to balance rigidity, durability, and shock absorption.

By providing shock absorption directly using the inherent geometries of the button assembly, viz. the hammer and landing pad, gaskets and dampers are no longer necessary while maintaining a similar (or greater) level of user comfort. Accordingly, the cost of producing the gaskets and/or dampers and the cost in human labor required to install the gaskets and dampers can be eliminated. Additionally, defects as a result of human error during installation can also be avoided.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
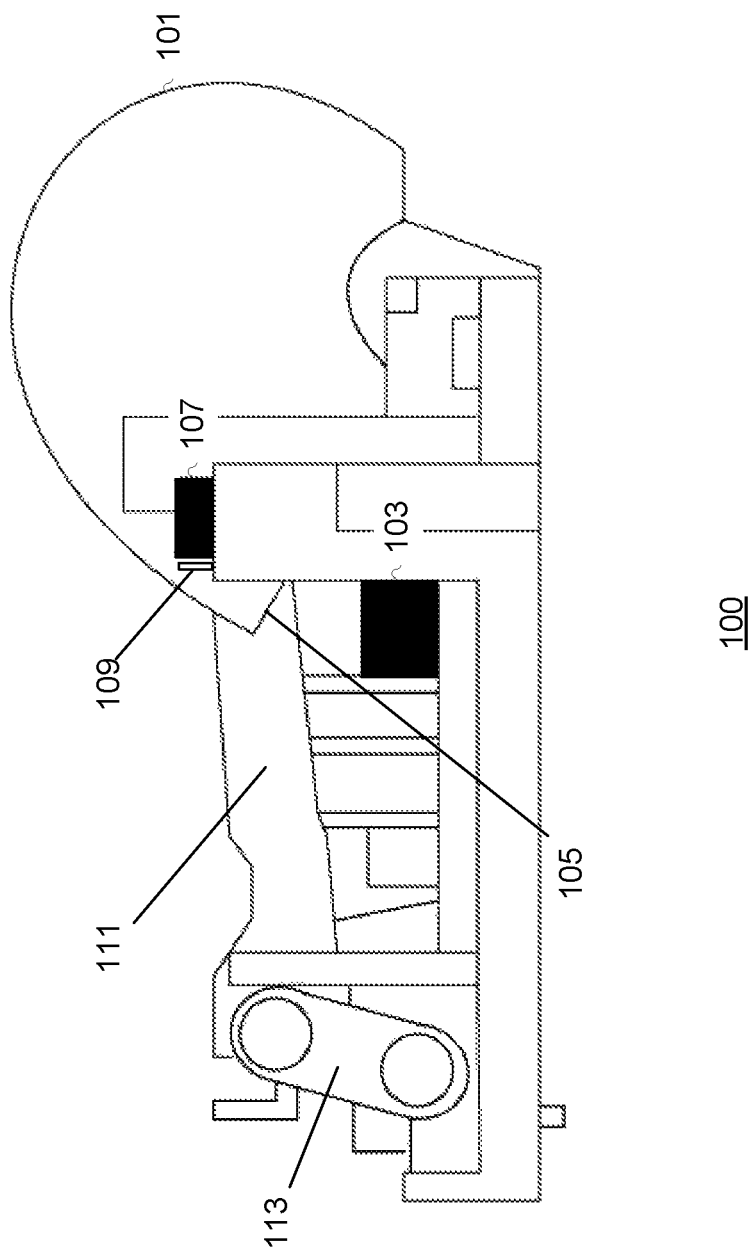
FIG. 1 depicts a schematic of a typical button assembly for a conventional gaming controller.

Reference will now be made in detail to the preferred embodiments of the invention, a method and system for the use of a shield can of a mobile computing device with improved heat management capability, examples of which are illustrated in the accompanying drawings. While the invention will be described in conjunction with the preferred embodiments, it will be understood that they are not intended to be limit to these embodiments. On the contrary, the invention is intended to cover alternatives, modifications and equivalents, which may be included within the spirit and scope as defined by the appended claims.

Furthermore, in the following detailed descriptions of embodiments of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the invention are directed to novel solutions for improving manufacturing of user input hardware devices by reducing the amount of parts and labor required during production using novel geometries to achieve high levels of user comfort and a rewarding user experience.

Conventional Striking Mechanisms

Figure 2:
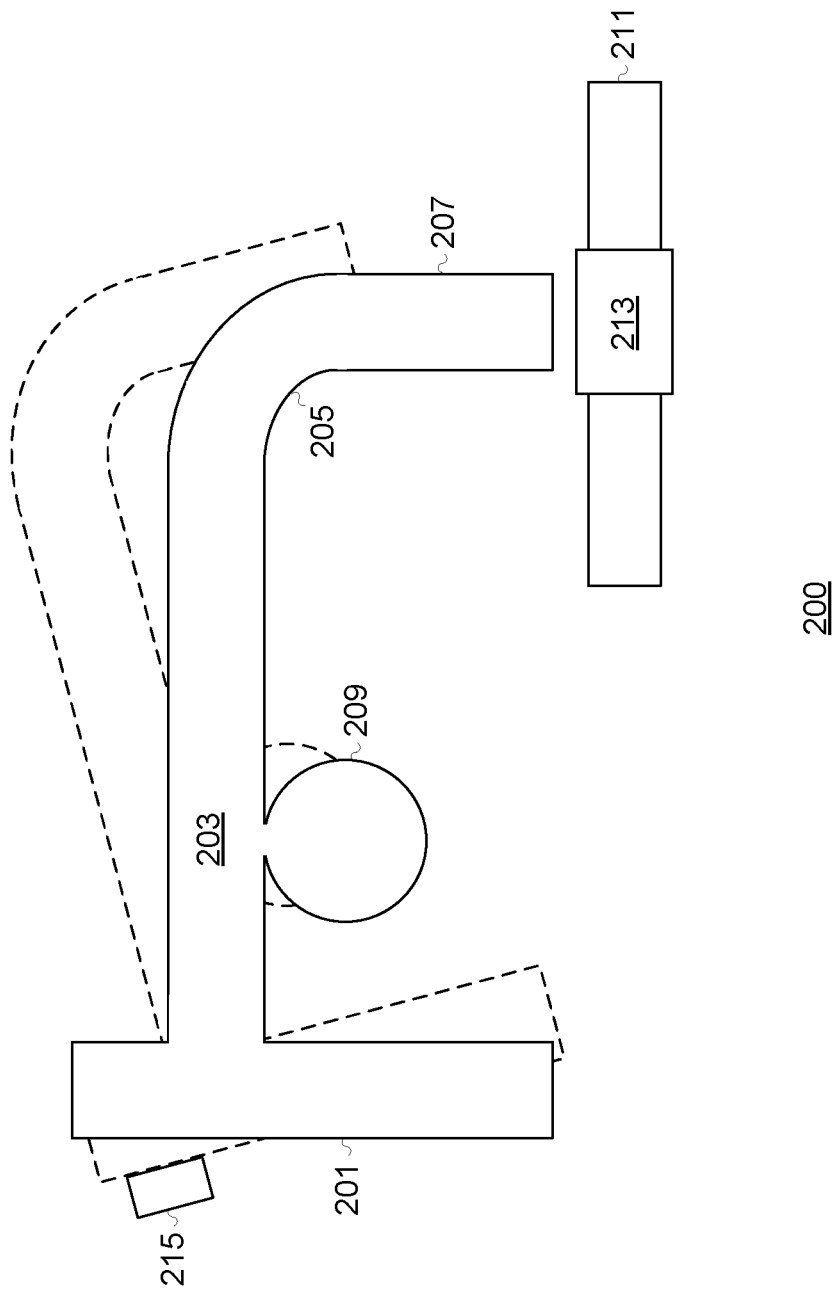
FIG. 2 depicts a diagram of a striking mechanism and landing pad in a button assembly according to conventional means.

FIG. 2 depicts a diagram 200 of a striking mechanism 201 and landing pad 211 in a button assembly according to conventional means. As depicted in FIG. 2, the striking mechanism 201 may include an arm attached to a corner or bend 205 that leads to a hammer 207. When in the pressed position (as represented by the solid lines), the striking mechanism is rotated to strike the landing pad 211. In many conventional implementations, the shock of the impact is absorbed by a damper 213 or gasket, typically made of a softer material, such as silicone.

As depicted, conventional striking mechanisms 201 typically have a substantially horizontal surface on both the striking surface of the hammer 207 and the landing pad 211 and damper 213. The range of motion along the arc traveled by the button assembly during a button press is such that the hammer strikes the landing pad 211 and damper 213 substantially perpendicularly. When the striking mechanism 201 is released (represented by the figure enclosed in the dotted line), the striking surface is raised (rotated) away—via the counterweight 209—from the landing pad 211 and damper 213 until it hits a second damper 215.

While effective for its purpose, the requirement of dampers (e.g., dampers 213 and 215) or gaskets presents an opportunity to reduce the cost of production.

Button Assemblies With Enhanced Geometries

Figure 3:
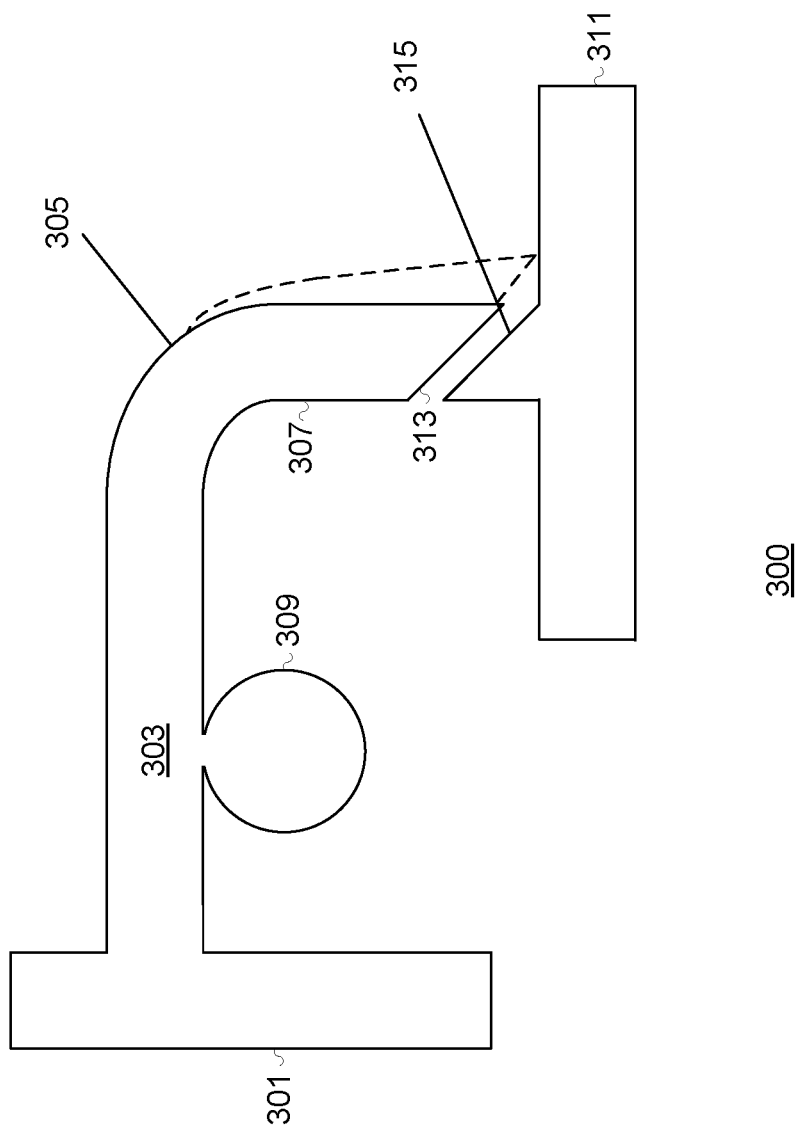
FIG. 3 depicts a diagram of a striking mechanism and landing pad in a button assembly in accordance with various embodiments of the present invention.

FIG. 3 depicts a diagram 300 of a striking mechanism 301 and landing pad 311 in a button assembly in accordance with various embodiments of the present invention. As depicted in FIG. 3, the striking mechanism 301 may also be implemented with an arm 303 and counterweight 309. However, unlike conventional button assemblies, instead of a rigid corner or bend, embodiments of the present invention are equipped with a flexible joint 305, which, when the button is pressed (via user motion) extends the hammer 307 forward and downward along the surface of the landing pad 311 (extension is represented as the figure enclosed by the dotted line).

As presented in FIG. 3, the bottom (striking) surface 313 of the hammer and the receiving surface 315 of the landing pad 311 are equipped with sloped surfaces, such that when the button assembly is pressed, the surfaces (313, 315) are pressed in contact at a substantially non-horizontal angle, with the striking surface 313 of the hammer 307 sliding downwards against the receiving surface 315 of the landing pad 311. By virtue of the particular geometry, the force of the impact is absorbed as the hammer 307 slides against the surface of the landing pad 311, with the kinetic energy being dissipated as a shearing force exerted during the contact of the surfaces (313, 315). The flexible joint 305 allows the slight movement (via slide) of the hammer 307 without permanently displacing any of the moving parts. In one or more embodiments, the hammer 307, landing pad 311, and/or joint 305 may be implemented using a softer material (such as a polycarbonate) that further increases the absorptive ability of the button assembly.

By providing shock absorption directly using the inherent geometries of the button assembly, viz. the hammer and landing pad, gaskets and dampers are rendered obsolete while maintaining a similar (or greater) level of user comfort. Accordingly, the cost of producing the gaskets and/or dampers and the cost in human labor required to install the gaskets and dampers can be eliminated. Additionally, defects as a result of human error during installation can also be avoided.

Figure 4:
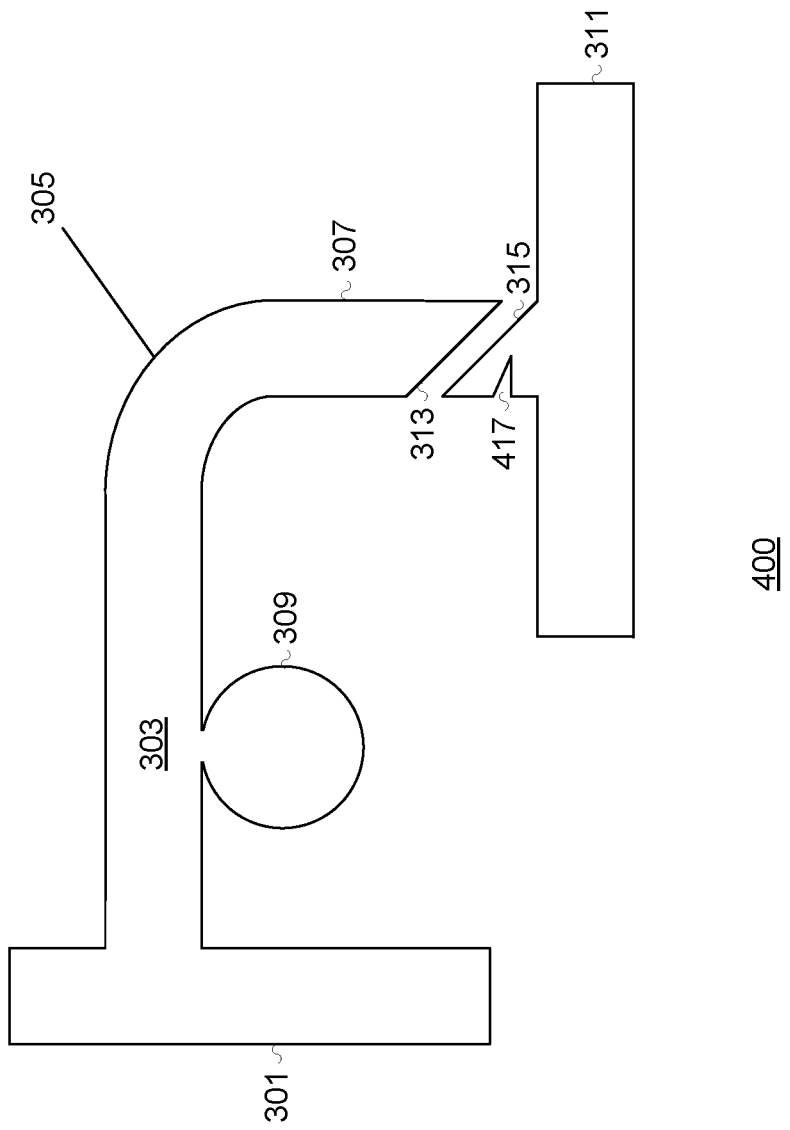
FIG. 4 depicts a diagram of a striking mechanism and landing pad with an angular cavity in a button assembly in accordance with various embodiments of the present invention.
Figure 5:
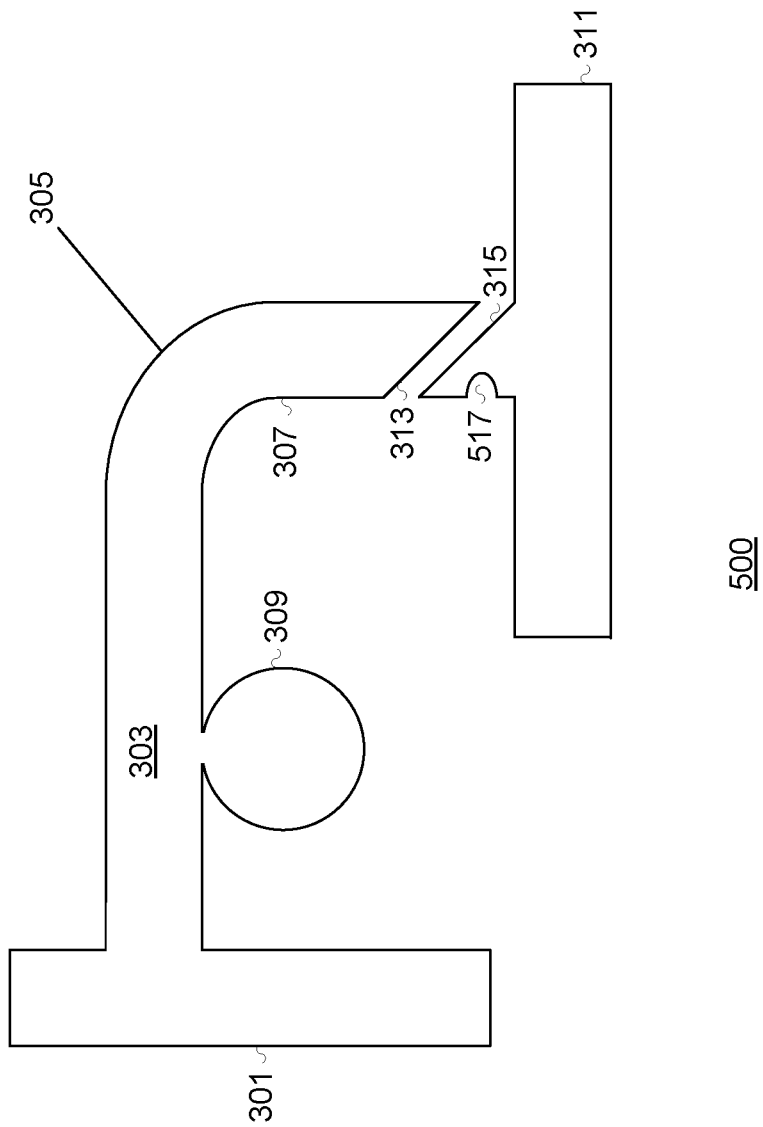
FIG. 5 depicts a diagram of a striking mechanism and landing pad with a rounded cavity in a button assembly in accordance with various embodiments of the present invention.
Figure 6:
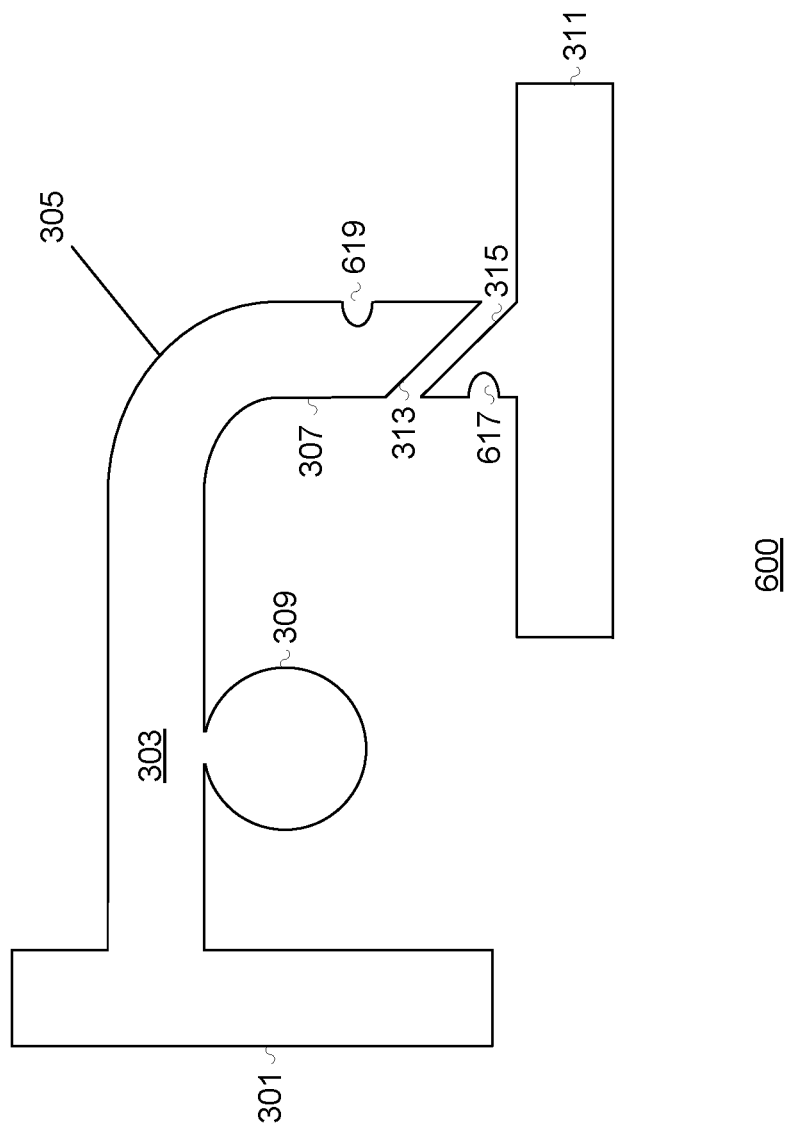
FIG. 6 depicts a diagram of a striking mechanism and landing pad, with rounded cavities, in a button assembly in accordance with various embodiments of the present invention.

FIGS. 4-6 depict diagrams (400, 500, and 600, respectively) of striking mechanisms with one or more cavities that increase the absorptive capacity of the button assembly, in accordance with various embodiments of the present invention. Each of FIGS. 4-6 is presented with a striking mechanism, 301, arm 303, flexible joint 305, hammer 307, counter weight 309, and landing pad 311, as described above with respect to FIG. 3. Likewise, the bottom or striking surface 313 of the hammer 307, and the receiving surface 315 of the landing pad 311 of each of the FIGS. 4-6 is presented with an angled surface. While the particular angle of the surface has been displayed consistently for illustrative purposes, it is to be understood that the exact angle itself may vary, and that embodiments of the present invention are well suited to include angles that are not depicted herein. Any angle may be suitable that allows the force of the impact from pressing the hammer 307 to the landing pad 311 to be redirected as a shearing force through movement (while contacted) of the hammer 307 along a surface of the landing pad 311.

As depicted in FIG. 4, the striking mechanism 401 may be further equipped with a cavity 417 in the landing pad 311. As presented, the cavity 417 may be an angular cavity (e.g., wedge) that reduces the rigidity of the protruding surface 315 of the landing pad, to allow a slight flexion of the surface 315 and increase the absorptive capacity.

As depicted in FIG. 5, the striking mechanism 501 may be equipped instead with a rounded cavity 517 that reduces the rigidity of the protruding surface 315 of the landing pad, to allow a slight flexion of the surface 315 and increase the absorptive capacity. The rounded cavity 517 presents different structural characteristics than the angular cavity 417 described above with respect to FIG. 4, such as the range of flexion, elasticity, and durability, and may be optimal when certain characteristics are specifically desired.

As depicted in FIG. 6, the striking mechanism 601 may be equipped with cavities (617, 619) in both the landing pad 311 as well as the hammer 307, each of which reduce the rigidity of the underlying component and providing a slight ability to flex around the cavity, thereby even further increasing the shock-absorptive capacity. While two rounded cavities (617, 619) are depicted in FIG. 6, embodiments are well suited to multiple cavities in excess of two in each of the hammer 307 and/or the landing pad 311, and the cavities themselves may be angular, round, or any combination of the two to optimize for target structural characteristics as so desired.

Figure 7:
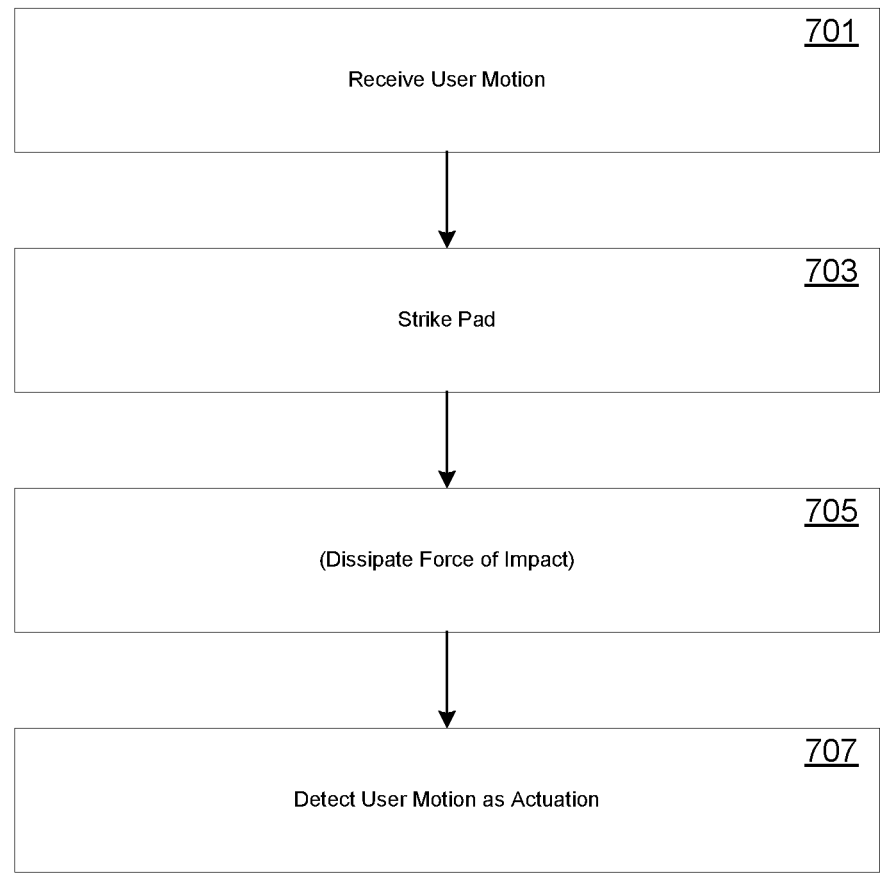
FIG. 7 depicts a flowchart of an exemplary process for registering a press of a button in a gaming controller in accordance with various embodiments of the present invention.

FIG. 7 depicts a flowchart 700 of an exemplary process for registering a press of a button in a gaming controller in accordance with various embodiments of the present invention. Steps 701-707 describe exemplary steps of the flowchart 700 in accordance with the various embodiments herein described.

At step 701, a user motion is received in a button assembly, such as the button assemblies described above with respect to FIGS. 3-6. In particular, the user motion (e.g., a downward motion such as a press) is received in a striking mechanism (e.g., a button). By virtue of the geometry of the striking mechanism, the user motion causes the striking mechanism to strike a landing pad at step 703. In one or more embodiments, the user motion received in step 701 causes the striking mechanism to rotate along a pre-determined arc to strike the landing pad at 703.

At step 705, the force from the impact of the striking mechanism striking the landing pad at step 703 is redirected by the specific geometries of the striking mechanism and the landing pad. In one or more embodiments, the striking surface of the striking mechanism that contacts the receiving surface of the landing pad—as well as the receiving surface itself—are each angled correspondingly such that the striking surface is able to slide along the receiving surface, thereby redirecting the force from the impact into a shearing force that is dissipated into the ambient environment.

Additional characteristics of the button assembly and the geometries of the striking mechanism and the landing pad may add to the ability of the entire assembly to absorb the shock of the impact. These characteristics may include, for example, greater elasticity of the striking mechanism and/or landing pad through softer material composition, the use of a flexible joint that allows the extension of the striking surface along the receiving surface of the landing pad without permanently displacing or disfiguring the assembly, and/or the usage of cavities in either the striking mechanism or the landing pad to reduce their respective structural rigidities and increase the amount of shock absorbed.

Finally, at step 705, the user motion is registered as an actuation of the button assembly via the movement of the striking mechanism at step 703. The actuation of the button assembly may be registered either through a sensor in the pad, or through a rotation of a gear or piston connected to the striking mechanism via a bar that extends and retracts as the striking mechanism is pressed and released.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A user input device for an electronic device, the user input device comprising;
   a landing pad having an angled pad surface;
     a button having a flexible striking mechanism coupled thereto, the flexible striking mechanism including an angled striking surface configured to strike the landing pad along the angled pad surface when the button is actuated, wherein the angled striking surface is configured to slide along the angled pad surface as the flexible striking mechanism flexes, and further wherein the flexible striking mechanism, angled striking surface and angled pad surface are configured to dissipate a force of an impact of the flexible striking mechanism striking the landing pad.

2. The user input device of claim 1, wherein the flexible striking mechanism comprises:
   an arm;
   an elastic joint disposed at the end of the arm; and
   a hammer attached to the arm at the flexible joint, wherein the angled striking surface comprises a bottom surface of the hammer.

3. The user input device of claim 2, wherein the elastic joint is configured to flex when the angled striking surface slides along the angled pad surface.

4. The user input device of claim 1, wherein a kinetic energy resulting from an impact of the flexible striking mechanism on the landing pad is partially dissipated as a shearing force when the angled striking surface slides along the angled pad surface.

5. The user input device of claim 1, wherein the user input device comprises a game controller.

6. The user input device of claim 1, wherein the user input device comprises at least one controller from the group consisting of:
   a game pad;
   a game console and pad combination system;
   a paddle device;
   a joystick device;
   a steering wheel device;
   a track ball device;
   a pedal device;
   a mouse;
   a keyboard;
   a touch screen device;
   an optical gun device;
   a rhythm controller device; and
   an instrument emulation device.

7. The user input device of claim 1, wherein the landing pad includes a non-contiguous side surface.

8. The user input device of claim 7, wherein the non-contiguous side surface of the landing pad includes a cavity, the cavity being configured to allow a flexion of the angled striking surface of the landing pad when the striking mechanism strikes the landing pad.

9. The user input device of claim 7, wherein the cavity comprises a rounded cavity.

10. The user input device of claim 7, wherein the cavity comprises an angular cavity.

11. The user input device of claim 1, wherein at least one of the flexible striking mechanism and the landing pad comprises a polycarbonate material.

12. The user input device of claim 1, wherein the button comprises at least one button from the group consisting of:
   a trigger button;
   a bumper button; and
   a shoulder button.

13. The user input device of claim 1, wherein the flexible striking mechanism includes a non-contiguous side surface.

14. A user input device for an electronic device, the user input device comprising;
   a landing pad having an angled pad surface;
     a button having a flexible striking mechanism coupled thereto, the flexible striking mechanism including an angled striking surface configured to strike the landing pad along the angled pad surface when the button is actuated, wherein the flexible striking mechanism includes a non-contiguous side surface, and further wherein the flexible striking mechanism, angled striking surface and angled pad surface are configured to dissipate a force of an impact of the flexible striking mechanism striking the landing pad.

15. The user input device of claim 14, wherein the non-contiguous side surface of the flexible striking mechanism includes a cavity, the cavity being configured to allow a flexion of the flexible striking mechanism when the angled striking surface contacts the angled pad surface.

16. The user input device of claim 15, wherein the cavity comprises a rounded cavity.

17. The user input device of claim 15, wherein the cavity comprises an angular cavity.

18. An electronic game controller, comprising:
   a circuit board comprising a plurality of micro-processors;
   a casing enclosing the circuit board; and
   a plurality of user input devices disposed along an exterior of the casing, wherein at least one of the plurality of user input devices includes:
     a landing pad having an angled pad surface;
     a button having a flexible striking mechanism coupled thereto, the flexible striking mechanism including an angled striking surface configured to strike the landing pad along the angled pad surface when the button is actuated, an arm, an elastic joint disposed at the end of the arm, and a hammer attached to the arm at the flexible joint, wherein the angled striking surface comprises a bottom surface of the hammer, and further wherein the angled striking surface is configured to slide along the angled pad surface as the striking mechanism flexes, and further wherein the flexible striking mechanism, angled striking surface and angled pad surface are configured to dissipate a force of an impact of the striking mechanism striking the landing pad.

19. A user input device for an electronic device, the user input device comprising:
   a landing pad having an angled pad surface and a non-contiguous side surface, the non-contiguous side surface having a cavity therein;
   a button having a striking mechanism coupled thereto, the striking mechanism including an angled striking surface configured to strike the landing pad along the angled pad surface when the button is actuated, wherein the cavity is configured to allow a flexion of the angled striking surface of the landing pad to dissipate a force of impact when the striking mechanism strikes the landing pad.

20. The user input device of claim 19, wherein the non-contiguous side surface of the landing pad includes a cavity, the cavity being configured to allow a flexion of the angled striking surface of the landing pad when the striking mechanism strikes the landing pad.

21. The user input device of claim 19, wherein the cavity comprises a rounded cavity.

22. The user input device of claim 19, wherein the cavity comprises an angular cavity.

\* \* \* \* \*